United States Patent
Navarro-Sorroche et al.

(10) Patent No.: US 10,182,491 B2
(45) Date of Patent: Jan. 15, 2019

(54) DEUTERIUM-DEUTERIUM NEUTRON GENERATORS

(71) Applicant: Halliburton Energy Services, Inc., Houston, TX (US)

(72) Inventors: Juan Navarro-Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 461 days.

(21) Appl. No.: 14/432,660

(22) PCT Filed: Dec. 30, 2013

(86) PCT No.: PCT/US2013/078292
§ 371 (c)(1),
(2) Date: Mar. 31, 2015

(87) PCT Pub. No.: WO2015/102576
PCT Pub. Date: Jul. 9, 2015

(65) Prior Publication Data
US 2016/0035440 A1 Feb. 4, 2016

(51) Int. Cl.
*H05H 3/06* (2006.01)
*G21G 4/02* (2006.01)
*G21B 1/19* (2006.01)
*E21B 47/00* (2012.01)
*E21B 49/00* (2006.01)

(52) U.S. Cl.
CPC ............... *H05H 3/06* (2013.01); *G21B 1/19* (2013.01); *G21G 4/02* (2013.01); *E21B 47/00* (2013.01); *E21B 49/00* (2013.01)

(58) Field of Classification Search
CPC .................................... H05H 3/06; G21G 4/02
USPC ............................................ 250/269.1, 269.4
See application file for complete search history.

(56) References Cited

U.S. PATENT DOCUMENTS

| 3,401,264 | A | * | 9/1968 | Carr ..................... G01V 5/102 376/111 |
| 3,883,760 | A | * | 5/1975 | Cunningham, Jr. .. H01J 35/065 313/309 |
| 4,272,699 | A | * | 6/1981 | Faubel ................... H01J 1/304 250/423 F |
| 4,996,017 | A | | 2/1991 | Ethridge |
| 5,293,410 | A | * | 3/1994 | Chen ...................... H05H 3/06 376/108 |

(Continued)

FOREIGN PATENT DOCUMENTS

WO WO-2015/102576 A1 7/2015

OTHER PUBLICATIONS

"International Application Serial No. PCT/US2013/078292, International Search Report dated Sep. 24, 2014", 3 pgs.

(Continued)

*Primary Examiner* — Sharon M Davis
(74) *Attorney, Agent, or Firm* — Gilliam IP PLLC (57) ABSTRACT

Various embodiments include apparatus and methods of using the apparatus having a neutron generator. The neutron generator can include a neutron generator tube having a cylindrical inner surface that bounds a cylindrical cavity, a field ionization array cylindrically distributed on the cylindrical inner surface, and a target rod positioned in the cylindrical cavity. Additional apparatus, systems, and methods are disclosed.

20 Claims, 4 Drawing Sheets

(56) References Cited

U.S. PATENT DOCUMENTS

| | | |
|---|---|---|
| 2005/0127282 A1 | 6/2005 | Grau et al. |
| 2009/0108192 A1* | 4/2009 | Groves ............... H05H 3/06 |
| | | 250/269.4 |
| 2009/0135982 A1* | 5/2009 | Groves ............... H05H 3/06 |
| | | 376/113 |
| 2009/0146052 A1 | 6/2009 | Groves et al. |
| 2010/0193685 A1 | 8/2010 | Chu et al. |
| 2010/0232559 A1 | 9/2010 | Takeishi et al. |
| 2012/0049054 A1* | 3/2012 | Zhou ............... B82Y 15/00 |
| | | 250/265 |
| 2013/0168542 A1 | 7/2013 | Navarro-sorroche |
| 2013/0170592 A1* | 7/2013 | Zhou ............... H01J 27/02 |
| | | 376/114 |
| 2015/0155127 A1* | 6/2015 | Fink ............... H05H 3/06 |
| | | 250/427 |

OTHER PUBLICATIONS

"International Application Serial No. PCT/US2013/078292, Written Opinion dated Sep. 24, 2014", 10 pgs.

GCC Serial Application No. 2014/28681; GCC Examination Report; dated Jan. 25, 2018, 4 pages.

GCC Application Serial No. GC 2014-28681, Examination Report, dated Sep. 27, 2017, 4 pgs.

\* cited by examiner

DEUTERIUM-DEUTERIUM NEUTRON GENERATORS

PRIORITY APPLICATIONS

This application is a U.S. National Stage Filing under 35 U.S.C. 371 from International Application No. PCT/US2013/078292, filed on 30 Dec. 2013; which application is incorporated herein by reference in its entirety.

TECHNICAL FIELD

The present invention relates generally to apparatus and methods of making and evaluating measurements.

BACKGROUND

In drilling wells for oil and gas exploration, understanding the structure and properties of the associated geological formation provides information to aid such exploration. A number of different measurements in a borehole can be performed to attain this understanding. Measurements may include using a neutron tool to make measurements to determine properties of a formation under investigation. Further, the usefulness, efficiency, and accuracy of traditional measurements may be related to the precision or quality of the techniques to attain and process data derived from such measurements. Techniques and apparatus to simplify measurements, to enhance processing of measured data, to enhance analysis of data from measurements to provide properties of a formation or borehole, or to provide combinations thereof can further aid in drilling operations.

Since its introduction several decades ago, pulsed neutron generators have been used by the oil and gas well logging industry for measuring certain properties of downhole formations. An example conventional pulsed neutron generator (NG) uses a Penning ion source neutron generator tube. For operation of such a NG tube, the Penning ion source section may consist of a cylindrical anode, a back cathode, and a front cathode with an aperture, and may require a constant magnetic field along the axis of symmetry that is provided by a permanent magnet. A high voltage pulse applied between the anode and cathode creates an arc discharge needed for initiating the ionization of a deuterium (D) gas in the ion source.

Penning discharge ion sources are notorious for the number of modes of operation and the shifting between them during operation. Penning ion sources are also known to produce mostly (~90%) diatomic deuterium ions. Once a particular geometry is selected, the ion source operation primarily depends on three parameters: a) the deuterium gas equilibrium pressure, b) the anode-cathode voltage, and c) the magnetic field intensity B. The uniform magnetic field across the ion source required for operation determines the use of either a permanent magnet or a solenoid, which adds mass, volume, and complexity to the ion source. In addition, the materials used in the construction of the permanent magnets need to be such that their magnetic properties do not degrade when exposed to the high temperature (>400 C) required for out-gassing the NG tube. The use of a solenoid, instead of the permanent magnets, requires providing two electrical connections to the tube, as well as the associated circuitry to supply the solenoid's current. Penning discharge ion sources use a high voltage pulse in the range of 2-6 kV to initiate and maintain the discharge, which may further complicate the circuitry and may compromise the reliability of the NG tube, as well as the controlling instrument.

DETAILED DESCRIPTION

The following detailed description is directed to various example embodiments. The accompanying drawings show, by way of illustration and not limitation, some of the various example embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Conventional NG tube implementations for the oil/gas well logging industry suffer from the limitations imposed by the logging application. The typical tool's diameter for a pulsed neutron logging (PNL) tool is 1.69 inch, with a maximum outer diameter of the order of 2 inch. It is therefore common practice to limit the tube's diameter to less than 1.5 inch. The small NG diameter limits the radial size of the components of the NG tube such as the target surface area. For a conventional NG tube to use a field ionization (FI) array as a source of monatomic ions, the array would have a surface area determined by the required beam current and the FI array surface density. A practical realization of a circular FI array with proper diameter to fit inside typical oil and gas industry NGs cannot physically provide the ion beam current needed for a required neutron yield.

In various embodiments, a pulsed neutron generator tube, having a FI array and a cylindrical target section, uses a deuterium-deuterium (D-D) fusion reaction. The FI array may include a bundle of nano-emitters made of, but not limited to, carbon nano-fibers or tungsten nano-tips, distributed around the inner surface of a cylindrical cavity of the neutron generator tube. The nano-structures enhance the operational electric fields to increase ion generation to a target. A concentric target section may include a target rod positioned at the center of the cylindrical cavity along its axis of symmetry. A high transparency secondary electrons suppressor grid of slightly larger diameter than the target rod can be concentrically placed around the target rod. Layers of titanium, erbium, and other transition metals can be deposited on the cylindrical surface of the target rod, forming a multilayer structure to absorb and retain deuterium gas in the target lattice. Ions generated by the FI array, largely composed of monatomic ions, are accelerated across the annular space between the FI array and the target rod to strike the deuterium atoms deposited on the target rod for the D-D fusion reaction to take place.

In various embodiments, a NG tube can be structured to remove geometric constraint limitations by using a radial ion-accelerating design. By using a rod's cylindrical surface as a target, the target's surface area is increased by approximately an order of magnitude. FI nano-tip arrays can be cylindrically distributed around the inner surface of the NG tube, where such arrangement of the FI array provides an FI array surface also increased by approximately an order of magnitude.

A NG can be structured such that it uses a deuterium-deuterium (D-D) fusion reaction for generating energetic neutrons, having a neutron-yield (n-yield) higher than 1e7 n/s. A NG can be structured with a target surface area approximately an order of magnitude higher than a conventional NG target surface area. A NG can be structured with a multilayer target made of multiple layers of titanium, erbium, and other transition metals for reducing deuterium desorption from the target thus increasing the n-yield.

Figure 1A:
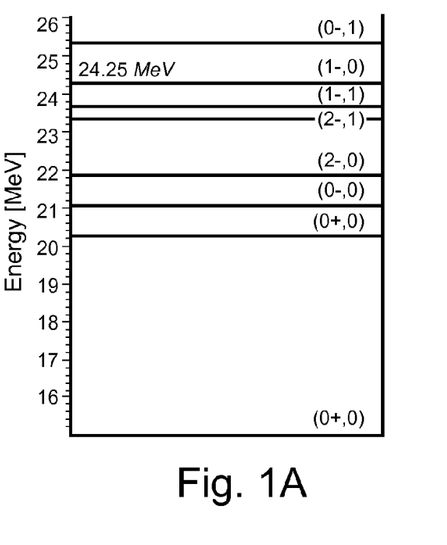
FIG. 1A is a schematic diagram of He4 nucleus energy levels, in accordance with various embodiments.
Figure 1B:
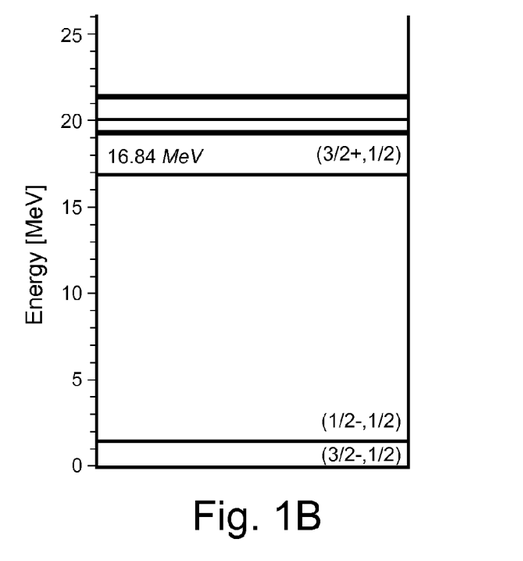
FIG. 1B is a schematic diagram of He5 nucleus energy levels, in accordance with various embodiments.

NGs used by the oil/gas well logging industry have historically been based on the deuterium-tritium (D-T) nuclear fusion reaction for producing highly energetic 14.1 MeV neutrons. One important reason for using the D-T reaction is that the fusion of deuterium and tritium has the lowest threshold energy and a higher cross section of the three possible nuclear fusion reactions of hydrogen isotopes: D-D reaction, D-T reaction, and T-T reaction. The reaction energy Q from the fusion of a deuterium and tritium nucleus to form the compound He5 nucleus has a value $$Q = (m_D + m_T - m_{He5})931.494 \sim 16.7957 \text{ MeV}, \tag{1}$$

which is approximately 44.3 keV lower than the energy corresponding to the second level of the He5 nucleus as shown in FIG. 1B. FIG. 1B is a schematic diagram of He5 nucleus energy levels. Angular momentum conservation for the D/T-He5 system gives $$_1^2D(s=1) + _1^3T(s=1/2) \rightarrow _2^5He(j=3/2) \tag{2}$$

Figure 2:
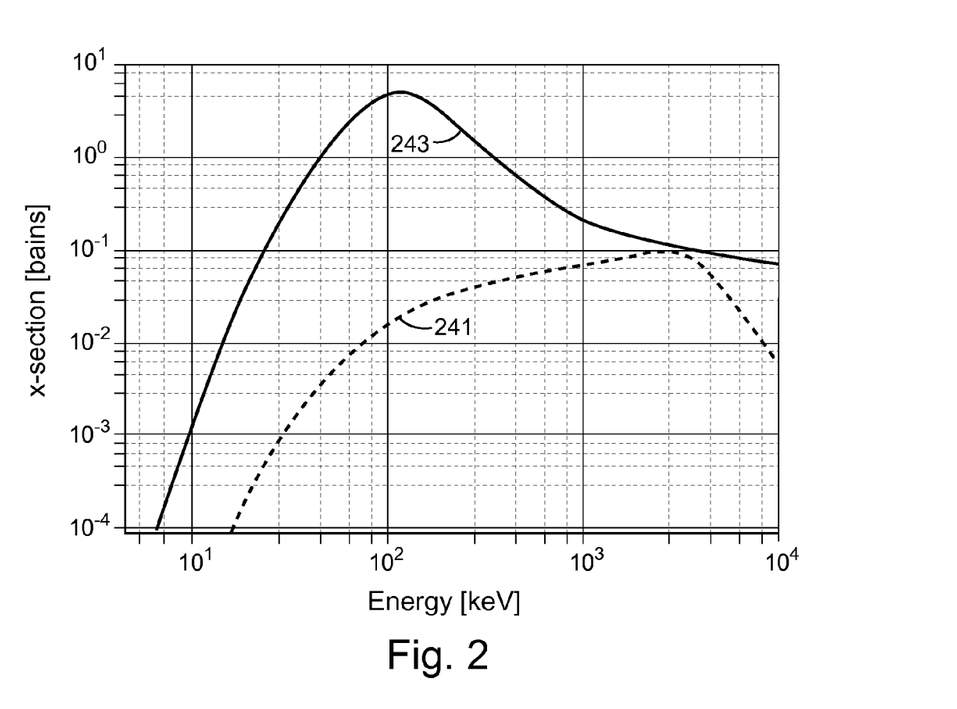
FIG. 2 is a plot of deuterium-deuterium and deuterium-tritium fusion reaction cross sections as a function of energy, in accordance with various embodiments.

The angular momentum of the D and T nuclei is equal to the angular momentum of the compound He5, and the energy of the D-T reaction is approximately 44.3 keV lower than the He5 compound nucleus second energy level. Thus, by giving the incident D ion a kinetic energy of just 44.3 keV, resonance tunneling to the second energy level of the He5 compound nucleus can be achieved. This is the known resonance tunneling of the D-T nuclear fusion reaction that explains the about a two order of magnitude higher cross section for the D-T reaction relative to the other two (D-D, T-T) fusion reactions at the D-T reaction resonance peak energy of approximately 107 keV, as shown in FIG. 2. FIG. 2 is a plot of deuterium-deuterium and deuterium-tritium fusion reaction cross sections as a function of energy. Curve 241 is for a D-D nuclear fusion reaction and curve 243 is for a D-T nuclear fusion reaction.

A similar calculation for the D-D fusion reaction gives $$Q = (2m_D - m_{He4})931.494 \sim 23.8477 \text{ MeV} \tag{3}$$

and $$_1^2D(s=1) + _1^2D(s=-1) \rightarrow _2^4He(j=0) \tag{4}$$

respectively. FIG. 1A is a schematic diagram of He4 nucleus energy levels. From FIG. 1A and equations 3 and 4, it can be concluded that resonance tunneling is not possible for the deuterium since the closest energy levels (23.64 and 24.25) both have angular momentum j=-1, thus the tunneling is forbidden because angular momentum is not conserved. Also from FIG. 1A, the closest j=0 state is the one corresponding to E=25.28 MeV. Thus, the energy of the incident D nucleus must be increased by over 1 MeV for resonance tunneling to be realized.

Neutron generators based on the D-T fusion reaction are thus the preferred source of high energy (14.1 MeV) neutrons because of their high neutron yield and the lower threshold energy (UHV) required for their operation. However, there are certain formation properties such as the hydrogen index where a source of lower energy neutrons is preferred. The D-D fusion reaction described by the equation $$_1^2D + _1^2D = _2^3He(0.82 \text{ MeV}) + n^0(2.45 \text{ MeV}) \tag{5}$$

produces neutrons of 2.45 MeV and can be a suitable neutron source for measuring the hydrogen index of the earth formations. Compared to the 14 MeV source neutron energy from the D-T generator, the D-D tube generates a neutron with much lower energy. The lower the source energy is, the more sensitive the measurement is for rock porosity. Another advantage of 2.45 MeV compared to 14 MeV is that the energy would be closer to the average energy of two typical chemical neutron sources (americium/beryllium (Am/Be) and californium-252). Thus, the environmental corrections would be expected to be similar. This similarity leads to easier acceptance for field use and adoption to formation evaluation workflow.

As shown in FIG. 2, at the ultra high voltage (UHV) of approximately 120 kV practically realizable in typical oil/well logging applications, the D-D fusion has reaction probabilities approximately two orders of magnitude lower than the D-T reaction. Thus, with all design parameters equal, the neutron yield of a neutron generator based on the D-D reaction is expected to be about two orders of magnitude lower than a generator based on the D-T fusion reaction. This reduction in neutron output will in turn reduce the count rate on the detecting instrumentation, thus increasing the counting statistics. The increase in counting statistics can be overcome by increasing the counting time interval, or equivalently for typical well logging applications, reducing the logging speed. In various embodiments, a D-D NG can be structured to provide sufficient neutron generator yield such that a two orders of magnitude decrease in logging speed to make up for the count rate reduction due to the D-D lower cross section can be avoided.

Figure 3:
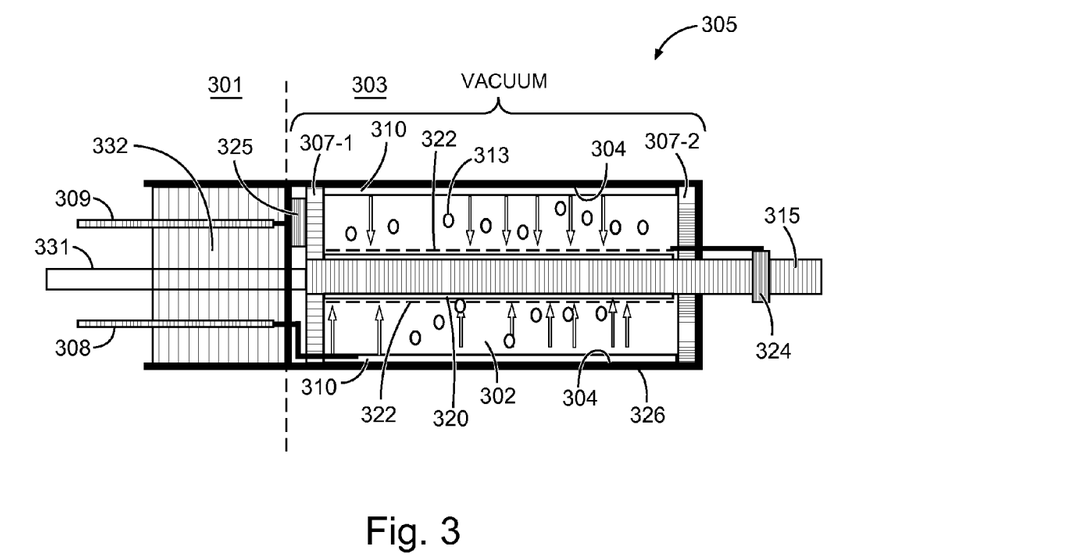
FIG. 3 is a schematic diagram of a cross-section of an example neutron generator tube based on the deuterium-deuterium fusion reaction, in accordance with various embodiments.

FIG. 3 is a schematic diagram of a cross-section of an example neutron generator tube 305 that is based on a deuterium-deuterium fusion reaction. The neutron generator tube 305 can be structured having an inner surface 304, a cylindrical cavity 302, and a field ionization array 310. The inner surface 304 is an inner surface of a neutron tube housing 326. The cylindrical cavity 302 provides a vacuum envelope to a target 320. The neutron generator tube 305 can be categorized as having two sections.

Section 301 is a gas/electrical control section that can include a gas reservoir control electrode 309 and a field ionization array control electrode 308. Section 301 can also include a gas filling tube 331 disposed through neutron tube header 332. Pulsing control can be realized by section 301.

Section 303 is an ion source-accelerator-target section having a gas reservoir element 325 coupled to the cylindrical cavity 302. The gas reservoir element 325 can provide a deuterium source to provide deuterium for deuterium-deuterium fusion reaction of the neutron generator tube 305. The cylindrical cavity 302 may be provided as the space between electric insulators 307-1 and 307-2. The electric insulator 307-2 may be structured such that a target rod 315 can be extended from within the cylindrical cavity 302 to a region exterior to the neutron tube housing 326. Outside the neutron tube housing 326, electrical connections can be made to the target rod 315.

The FI array 310 can be cylindrically distributed on the inner surface 304 of the neutron tube housing 326. The FI array 310 can include a bundle of nano-emitters, distributed around the inner cylindrical surface 304 of the neutron generator tube 305. The nano-emitters may be made of tungsten nano-tips or carbon nano-fibers. The field ionization array 310 can be cylindrically distributed such that the field ionization array 310 is capable of producing over 50% of monatomic deuterium ions. The cylindrical FI array 310 on the inner surface of the cylindrical cavity increases the active surface area of the FI array 310 by over an order of magnitude, thus providing similar order of magnitude increase in monatomic D ions relative to conventional designs.

The target rod 315 can be positioned in the cylindrical cavity 302, providing a concentric target section. The target rod 315 of the concentric target section may be positioned along the axis of symmetry of the neutron generator tube 305 at the center of the cylindrical cavity 302. The target 320 can be disposed on the target rod 315. The target 320 can have material layers disposed on the surface of the target rod 315. The target 320 may be realized as a multilayer film 320, which can be disposed on the cylindrical surface of the target rod 315 for the purpose of absorbing deuterium atoms. The material layers of the multilayer film 320 can include one or more transition metals. The one or more transition metals include one or more of titanium and erbium. Other transition metals may be used. These materials can be deposited on the target rod 315. The multilayer film 320 disposed on the target rod 315 can provide a multilayer target rod positioned at the center and along the axis of symmetry of the cylindrical cavity of the NG tube, having its cylindrical surface implanted with thin layers of titanium, erbium and/or other transition metal materials. By using the cylindrical surface as the target 320 instead of only one of the cross sectional faces of the target rod, the target area can be increased by approximately an order of magnitude, increasing the neutron yield of the neutron generator by approximately the same magnitude. A target suppressor grid 322 can be disposed around the target 320. A suppressor electrode 324 can be coupled to the target suppressor grid 322 to control the target suppressor grid 322.

In operation, ions 313 generated by the FI array 310, mostly composed of monatomic D ions, are accelerated across the annular space in the cylindrical cavity 302 between the FI array 310 and the target rod 315 to impact the deuterium atoms deposited in the rod's thin multilayer film 320, which provides a multilayer target 320. The FI array 310 and the multilayer target 320 provide a plasma target that allows for ions to undergo many collisions before being removed by an UHV electrode expending energy in heating the electrode. The collision of the accelerated D ions with the D atoms implanted in the multilayer target 320 results in the fusion reaction described by the equation $$_1^2 D + _1^2 D = \begin{cases} _2^3 He(0.82 \text{ MeV}) + n^0(2.45 \text{ MeV}) \\ _1^3 T(101 \text{ MeV}) + p^0(3.02 \text{ MeV}) \end{cases} \quad (6)$$

resulting in the production of an $_2^3$He nucleus and a $_0^1$n neutron, and a $_1^3$T nucleus and a $_1^1$p proton with equal probability. The design of the neutron generator tube 305 can provide a mechanism to maximize the n-yield to use the fact that the D-D reaction produces energetic neutron with 50% efficiency according to equation 1. The generated neutrons propagate through the structure that defines the cylindrical cavity 302.

In various embodiments, the neutron generator tube 305 can have a turn-on/turn-off time delay lower than 1 microsecond. Typical turn-on/turn-off times of field ionization array 310 can be in the nanoseconds range. This turn-on/turn-off time delay can be compared to a conventional NG having a turn-on/turn-off time of approximately 5 microseconds. The neutron generator tube 305 can have a D-D fusion reaction that provides a neutron production yield higher than 1e7 neutron per second. The neutron generator tube 305 can be disposed as part an apparatus that can be used to make measurements related to a drilling operation. The neutron generator tube 305 can be disposed in a housing capable of a wireline deployment. The neutron generator tube 305 can be disposed in a housing capable of a logging-while-drilling (LWD) deployment.

Neutron generator targets of conventional design typically consist of a copper rod of less than half inch in diameter. This axial design together with the geometric constraints, imposed by the typical oil/gas well logging applications, reduces the target's area available for the D-D fusion reaction to the rod's sectional area facing the extraction aperture of the conventional design. The relatively small target surface area of conventional NGs determines the thickness of the titanium layer deposited in the cross sectional area of the target rod. Because of the large difference in thermal conductivity of titanium κ=21.9 W/mK° relative to the thermal conductivity of copper κ=401 W/mK°, the thicker the titanium layer deposited on the target face, the higher the temperature increase due to deuterium ions bombardment during the tube's operation. The titanium layer on the target rod can therefore reach temperatures in excess of 250° C., at which point titanium starts desorbing the implanted deuterium in the target area substantially lowering the neutron yield. By increasing the target's surface, using the design of the neutron generator tube as taught herein, into more than an order of magnitude, the amount of material of the multilayer target of such a neutron generator tube can be largely reduced, improving the heat transfer to the copper rod and thus, reducing deuterium desorption at elevated temperatures.

In various embodiments, a NG tube having a D-D fusion reaction can have a neutron production yield higher than 1e7 neutron per second. Neutron yield of conventional neutron generator tubes based on the D-T fusion reaction is in the order of 1e8 neutron per second mainly limited by: a) ion extraction efficiency, b) ion beam coverage of target surface area, c) power dissipation of the target rod, and d) thermal desorption of D/T at a titanium layer of the conventional neutron generator. By using a FI array to directly ionize deuterium gas as taught herein, over 50% monatomic D ions can be produced when compared with conventional D/T NG tubes designs. The large percentage of monatomic D ions increases the output n-yield of the NG by similar amount. Moreover, by having the cylindrical surface of the rod as the target as taught herein, an order of magnitude higher surface is available for the D-D fusion reaction to take place. By reducing the thickness of titanium, erbium, and other transition metals layers coated on a target rod as taught herein, neutron yield reduction associated with thermal desorption of the target is largely reduced.

The neutron yield of a NG can be doubled by using monatomic instead of molecular deuterium or tritium ions. Neutron generators using RF ion sources are capable of producing up to 90% monatomic D/T ions. However, the power consumption, as well as the electromechanical complexity is a well-known limitation of the RF ion source NG tubes. Considering the ratio of percentage of monatomic ions to input power as a figure of merit, RF based NG tubes exhibit the lowest $$\left(0.0018 \frac{\% \text{ mono}}{W}\right)$$

figure of merit among existing ion source technologies. Field ionization ion sources are capable of producing over 50% monatomic D and T ions at a fraction of the power needed by RF ion sources. A typical figure of merit in percentage of monatomic ions to watts ratio for the FI ion sources is $$0.1 \frac{\% \text{ mono}}{W}.$$

FI ion source neutron generators are therefore a power efficient alternative for well logging applications to other ion sources technologies.

The use of FI arrays makes a neutron generator, similar to or identical to neutron generator as taught herein, a power efficient neutron generator for well logging applications. The plasma target provided by such a neutron generator tube allows for ions to undergo many collisions before being removed from the beam by its UHV electrode expending energy in heating the electrode. The wasted heating energy is therefore largely reduced adding to the overall efficiency of a NG tube similar to or identical neutron generator as taught herein.

Figure 4:
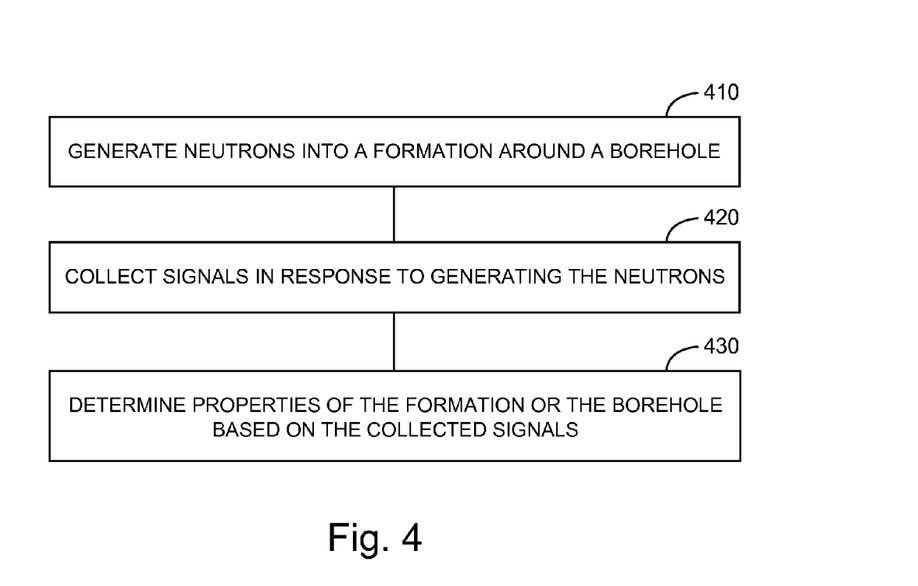
FIG. 4 is a flow diagram of features of an example method of making measurements using neutrons, in accordance with various embodiments.

FIG. 4 is a flow diagram of features of an embodiment of a method of making measurements using neutrons. At 410, neutrons are generated into a formation around a borehole. The neutrons can be generated using a neutron generator tube based on deuterium-deuterium fusion reaction, the neutron generator tube having an inner surface and a cylindrical cavity, a deuterium source to provide deuterium for the deuterium-deuterium fusion reaction, a field ionization array cylindrically distributed on the inner surface; and a target rod positioned in the cylindrical cavity. At 420, signals are collected in response to generating the neutrons. At 430, properties of the formation or the borehole are determined based on the collected signals. Using the neutron generator tube can include using a bundle of nano-emitters as part of the field ionization array. Using the neutron generator tube with the field ionization array distributed such that the field ionization array can be capable of producing over 50% of monatomic deuterium ions. Using the neutron generator tube can include using a neutron generator tube having a turn-on/turn-off time delay lower than 1 micro second. Using the neutron generator tube can include using a neutron generator tube that has a deuterium-deuterium fusion reaction with a neutron production yield higher than 1e7 neutron per second. Using the neutron generator tube can include using the neutron generator tube disposed in a wireline deployment. Using the neutron generator tube can include using the neutron generator tube disposed in a logging-while-drilling deployment. The method or similar methods can include using neutron generator tubes similar to or identical to neutron generator tubes as taught herein.

In various embodiments, a non-transitory machine-readable storage device can comprise instructions stored thereon, which, when performed by a machine, cause the machine to perform operations, the operations comprising one or more features similar to or identical to features of methods and techniques related to making measurements using neutrons from a neutron generator tube as described herein. The physical structure of such instructions may be operated on by one or more processors. Executing these physical structures can cause the machine to perform operations comprising any or combinations of the features of the methods taught herein or using any or combinations of the features of the apparatus taught herein. Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 5:
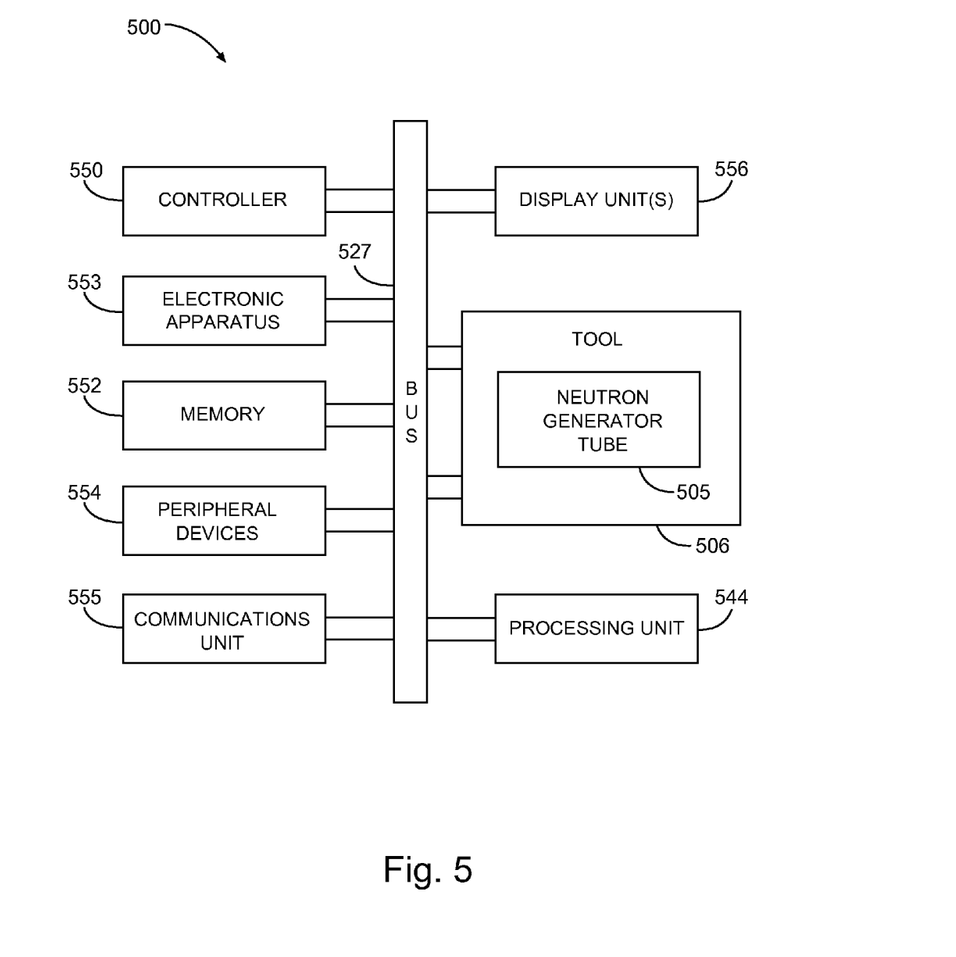
FIG. 5 is a block diagram of features of an example system operable to determine properties of a formation using a neutron generator tube, in accordance with various embodiments.

FIG. 5 is a block diagram of an embodiment of features of an example system 500 operable to determine properties of a formation using a neutron generator tube 505, as described herein or in a similar manner. The system 500 can include a tool 506 having the neutron generator tube 505 that can be realized in a similar or identical manner to arrangements and processing discussed herein. The system 500 can be configured to operate the neutron generator tube 505 in accordance with the teachings herein.

The system 500 can include a controller 550, a memory 552, an electronic apparatus 553, and a communications unit 555. The memory 552 can be structured to include a database. The controller 550, the memory 552, and the communications unit 555 can be arranged to operate as a processing unit to control operation of the tool 506 and to perform operations on the signals collected by the tool 506 to conduct evaluation of the formation. A processing unit 544, structured to conduct evaluation of the formation using one or more neutron generator tubes 505, can be implemented as a single unit or distributed among the components of the system 500 including electronic apparatus 553. The electronic apparatus 553 can provide other circuitry for operation of the system 500. The controller 550 and the memory 552 can operate to control activation of the neutron generator tube 505 to generate neutron pulses. The controller 550 and the memory 552 can operate to control selection of the tool 506 and to manage processing schemes. The controller 550, the memory 552, and other components of the system 500 can be configured, for example, to operate similar to or identical to the components discussed herein or similar to or identical to any of methods discussed herein.

The communications unit 555 can include downhole communications for appropriately located sensors in a drilling operation. Such downhole communications can include a telemetry system. The communications unit 555 may use combinations of wired communication technologies and wireless technologies at frequencies that do not interfere with on-going measurements.

The system 500 can also include a bus 537, where the bus 537 provides electrical conductivity among the components of the system 500. The bus 537 can include an address bus, a data bus, and a control bus, each independently configured or in an integrated format. The bus 537 can be realized using a number of different communication mediums that allows for the distribution of components of the system 500. The bus 537 can include a network. Use of the bus 537 can be regulated by the controller 550.

In various embodiments, the peripheral devices 550 can include additional storage memory and other control devices that may operate in conjunction with the controller 550 and the memory 552. In an embodiment, the controller 550 can be realized as a processor or a group of processors that may operate independently depending on an assigned function.

The system 500 can include display unit(s) 560 as a distributed component on the surface at a drilling operation, which can be used with instructions stored in the memory 552 to implement a user interface to monitor the operation of the tool 506 or components distributed within the system 500. The user interface may be used to input parameter values for thresholds such that the system 500 can operate autonomously substantially without user intervention in a variety of applications. The user interface can also provide for manual override and change of control of the system 500 to a user. Such a user interface can be operated in conjunction with the communications unit 555 and the bus 537.

Figure 6:
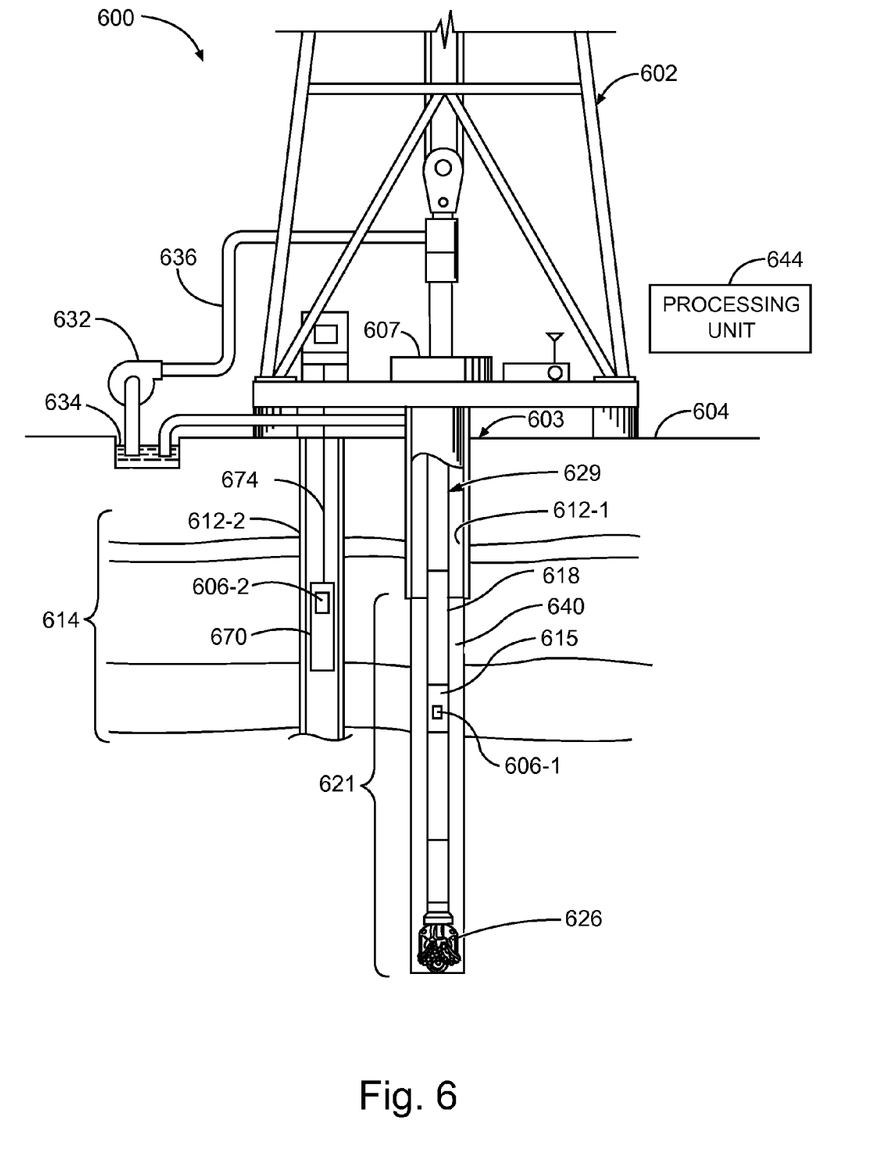
FIG. 6 is a schematic diagram of an example system at a drilling site, where the system is operable with apparatus having a neutron generator tube, in accordance with various embodiments.

FIG. 6 is a schematic diagram of an example system 600 at a drilling site, where the system is operable with apparatus having a neutron generator tube, as described herein or in a similar manner. The system 600 can include a tool 606-1, 606-2, or both 606-1 and 606-2 to conduct measurements and analysis using one or more neutron generator tubes as taught herein. Tools 606-1 and 606-2 can be realized in a similar or identical manner to arrangements taught herein.

System 600 can include a drilling rig 602 located at a surface 604 of a well 603 and a string of drill pipes, that is, drill string 629, connected together so as to form a drilling string that is lowered through a rotary table 607 into a wellbore or borehole 612-1. Drilling rig 602 can provide support for drill string 629. Drill string 629 can operate to penetrate rotary table 607 for drilling the borehole 612-1 through subsurface formations 614. Drill string 629 can include drill pipe 618 and a bottom hole assembly 621 located at the lower portion of drill pipe 618.

The bottom hole assembly 621 can include a drill collar 615 and a drill bit 626. Drill bit 626 can operate to create borehole 612-1 by penetrating the surface 604 and the subsurface formations 614. Bottom hole assembly 621 can include tool 606-1 attached to drill collar 615 to perform measurements to conduct formation evaluation. Tool 606-1 can be structured for an implementation in a measure-while-drilling (MWD) system such as a LWD system. The housing containing tool 606-1 can include electronics to control tool 606-1 and collect responses from tool 606-1. Such electronics may include a processing unit to provide analysis of data to the surface over a standard communication mechanism for operating in a well. Alternatively, electronics can include a communications interface to provide signals output by the tool 606-1 to the surface over a standard communication mechanism for operating in a well, where these output signals can be analyzed at a processing unit 644 at the surface.

During drilling operations, drill string 629 can be rotated by rotary table 607. In addition to, or alternatively, the bottom hole assembly 621 can also be rotated by a motor (e.g., a mud motor) that is located downhole. Drill collars 615 can be used to add weight to drill bit 626. Drill collars 615 also can stiffen the bottom hole assembly 621 to allow the bottom hole assembly 621 to transfer the added weight to drill bit 626, and in turn, assist drill bit 626 in penetrating surface 604 and subsurface formations 614.

During drilling operations, a mud pump 632 can pump drilling fluid (sometimes known by those of skill in the art as "drilling mud") from a mud pit 634 through a hose 636 into drill pipe 618 and down to drill bit 626. The drilling fluid can flow out from drill bit 626 and be returned to the surface 604 through an annular area 640 between drill pipe 618 and the sides of the borehole 612-1. The drilling fluid may then be returned to mud pit 634, where such fluid is filtered. In some embodiments, the drilling fluid can be used to cool drill bit 626, as well as to provide lubrication for drill bit 626 during drilling operations. Additionally, the drilling fluid may be used to remove subsurface formation 614 cuttings created by operating drill bit 626.

In various embodiments, tool 606-2 may be included in a tool body 670 coupled to a logging cable 674 such as, for example, for wireline applications. The tool body 670 containing the tool 606-2 can include electronics to control tool 606-2 and collect responses from the tool 606-2. Such electronics may include a processing unit to provide analysis of data to the surface over a standard communication mechanism for operating in a well. Alternatively, electronics can include a communications interface to provide signals output by the tool 606-2 to the surface over a standard communication mechanism for operating in a well, where these output signals can be analyzed at the processing unit 644 at the surface. The logging cable 674 may be realized as a wireline (multiple power and communication lines), a mono-cable (a single conductor), and/or a slick-line (no conductors for power or communications), or other appropriate structure for use in the borehole 612-2. Though, for convenience, FIG. 6 depicts both an arrangement for wireline applications and an arrangement for LWD applications, the system 600 may be also realized for one of the two applications or both applications in a single well at different times.

Neutron generators based on the D-D fusion reaction produce neutrons of approximately 2.45 MeV. Neutrons in this range of energy are a better interacting tool than the range of conventional neutron generators for measuring properties such as hydrogen index and formation porosity. The structure of a D-D neutron generator, as taught herein, can overcome some of the limitations of conventional structures for D-D implementation such as n-yield lower than two order of magnitude relative to similar D-T based NG.

In various embodiments, an apparatus can include a neutron generator tube having combinations of features as described herein. Different features presented herein may be used in a number of embodiments. In various embodiments, an apparatus 1 comprises: a neutron generator tube having an inner surface and a cylindrical cavity; a deuterium source to provide deuterium for deuterium-deuterium fusion reaction of the neutron generator tube; a field ionization array cylindrically distributed on the inner surface; and a target rod positioned in the cylindrical cavity. An apparatus 2 can include the features of apparatus 1 and can include the target rod positioned along an axis of symmetry of the neutron generator at the center of the cylindrical cavity. An apparatus 3 can include the features of any of apparatus 1 or 2 and can include the field ionization array to include a bundle of nano-emitters. An apparatus 4 can include the features of apparatus 3 and can include the nano-emitters being made of tungsten nano-tips or carbon nano-fibers. An apparatus 5 can include the features of any of apparatus 1-4 and can include the field ionization array distributed such that the field ionization array is capable of producing over 50% of monatomic deuterium ions. An apparatus 6 can include the features of any of apparatus 1-5 and can include the target rod having material layers disposed on the surface of the target rod. An apparatus 7 can include the features of apparatus 6 and can include the material layers to include one or more transition metals. An apparatus 8 can include the features of apparatus 7 and can include the one or more transition metals to include one or more of titanium and erbium. An apparatus 9 can include the features of any of apparatus 1-8 and can include the neutron generator tube having a turn-on/turn-off time delay lower than 1 micro second. An apparatus 10 can include the features of any of apparatus 1-9 and can include the neutron generator tube having a deuterium-deuterium fusion reaction with a neutron production yield higher than 1e7 neutron per second. An apparatus 11 can include the features of any of apparatus 1-10 and can include the neutron generator tube disposed in a housing capable of a wireline deployment. An apparatus 12 can include the features of any of apparatus 1-10 and can include the neutron generator tube disposed in a housing capable of a logging-while-drilling deployment. Features of any of apparatus 1-12 or other combinations of features, as taught herein, may be combined into an apparatus according to the teachings herein.

In various embodiments, a method 13 comprises: generating neutrons into a formation around a borehole using a neutron generator tube based on deuterium-deuterium fusion reaction, the neutron generator tube having an inner surface and a cylindrical cavity, a deuterium source to provide deuterium for the deuterium-deuterium fusion reaction, a field ionization array cylindrically distributed on the inner surface; and a target rod positioned in the cylindrical cavity; collecting signals in response to generating the neutrons; and determining properties of the formation or the borehole based on the collected signals. A method 14 can include the features of method 13 and can include using the neutron generator tube to include using a bundle of nano-emitters as part of the field ionization array. A method 15 can include the features of any of methods 13 or 14 and can include using the neutron generator tube with the field ionization array distributed such that the field ionization array is capable of producing over 50% of monatomic deuterium ions. A method 16 can include the features of any of methods 13-15 and can include using the neutron generator tube to include using a neutron generator tube having a turn-on/turn-off time delay lower than 1 micro second. A method 17 can include the features of any of methods 13-16 and can include using the neutron generator tube to include using a neutron generator tube that has a deuterium-deuterium fusion reaction with a neutron production yield higher than 1e7 neutron per second. A method 18 can include the features of any of methods 13-17 and can include using the neutron generator tube to include using the neutron generator tube disposed in a wireline deployment. A method 19 can include the features of any of methods 13-17 and can include using the neutron generator tube includes using the neutron generator tube disposed in a logging-while-drilling deployment. Features of any of methods 13-19 or other combinations of features, as taught herein, may be combined into a procedure according to the teachings herein.

In various embodiments, a machine-readable storage device 20 has instructions stored thereon, which, when performed by a machine, cause the machine to perform operations, the operations comprising the features of any of methods 13-19 or using the features of any of apparatus 1-12 or other combinations of features as taught herein.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
    a neutron generator tube having a cylindrical inner surface that bounds a cylindrical cavity;
    a deuterium source that provides deuterium within the cylindrical cavity;
    a target rod positioned in the cylindrical cavity, wherein the target rod comprises a rod material and a first material layer disposed on the rod material, wherein the first material layer has a thermal conductivity less than copper, and wherein the target rod has a second material layer disposed on the first material layer; and
    a field ionization array cylindrically distributed around the cylindrical inner surface.

2. The apparatus of claim 1, wherein the target rod is positioned along an axis of symmetry of the neutron generator tube at a center of the cylindrical cavity.

3. The apparatus of claim 1, wherein the field ionization array comprises a bundle of nano-emitters.

4. The apparatus of claim 3, wherein the bundle of nano-emitters comprises at least one of tungsten nano-tips and carbon nano-fibers.

5. The apparatus of claim 1, wherein the first material layer include one or more transition metals.

6. The apparatus of claim 5, wherein the one or more transition metals include one or more of titanium and erbium.

7. The apparatus of claim 1, wherein the neutron generator tube is disposed in a housing configured for a wireline deployment.

8. The apparatus of claim 1, wherein the neutron generator tube is disposed in a housing configured for a logging-while-drilling deployment.

9. The apparatus of claim 1, further comprising a suppressor grid, wherein the suppressor grid is positioned concentrically around the target rod.

10. The apparatus of claim 1, further comprising an electric insulator disposed between the deuterium source and the target rod.

11. A method comprising:
    generating neutrons into a formation around a borehole using an apparatus comprising,
        a neutron generator tube comprising a cylindrical inner surface that bounds a cylindrical cavity,
        a deuterium source that provides deuterium within the cylindrical cavity,
        a target rod positioned in the cylindrical cavity, wherein the target rod comprises a rod material and a first material layer disposed on the rod material, and wherein the target rod has a second material layer disposed on the first material layer, and a field ionization array cylindrically distributed around the cylindrical inner surface; collecting signals in response to generating the neutrons; and determining properties of the formation or the borehole based on the collected signals.

12. The method of claim 11, wherein using the neutron generator tube includes using a bundle of nano-emitters as part of the field ionization array.

13. The method of claim 11, further comprising disposing the neutron generator tube in a wireline housing.

14. The method of claim 11, further comprising disposing the neutron generator tube in a logging-while-drilling housing.

15. The method of claim 11, wherein generating neutrons comprises applying a voltage pulse to a field ionization electrode attached to the field ionization array, wherein the voltage pulse is less than 120 kilovolts, and wherein the voltage pulse produces a monatomic deuterium ratio greater than or equal to 50%.

16. The method of claim 11, wherein generating neutrons comprises applying a turn-on/turn-off time delay of the field ionization array that is less than 1 microsecond.

17. An apparatus comprising:
a neutron generator tube having a cylindrical inner surface that bounds a cylindrical cavity;
a deuterium source that provides deuterium within the cylindrical cavity;
a target rod positioned in the cylindrical cavity, wherein the target rod comprises a rod material, a first material layer disposed on the rod material, and a second material layer disposed on the first material layer; and
a field ionization array cylindrically distributed around the cylindrical inner surface.

18. The apparatus of claim 17, wherein the target rod is positioned along an axis of symmetry of the neutron generator tube at a center of the cylindrical cavity.

19. The apparatus of claim 17, wherein the field ionization array comprises a bundle of nano-emitters.

20. The apparatus of claim 17, wherein the first material layer comprises one or more transition metals.

* * * * *